(12) United States Patent
Reinmuth

(10) Patent No.: US 11,491,754 B2
(45) Date of Patent: Nov. 8, 2022

(54) METHOD AND DEVICE FOR CONTROLLING A PRESS BASED ON WEDGE DRIVE TOOL SPRING CONDITION

(71) Applicant: Fibro GmbH, Hassmersheim (DE)

(72) Inventor: Norbert Reinmuth, Hassmersheim (DE)

(73) Assignee: Fibro GmbH, Hassmersheim (DE)

( * ) Notice: Subject to any disclaimer, the term of this patent is extended or adjusted under 35 U.S.C. 154(b) by 622 days.

(21) Appl. No.: 16/595,557

(22) Filed: Oct. 8, 2019

(65) Prior Publication Data
US 2020/0039165 A1 Feb. 6, 2020

Related U.S. Application Data

(63) Continuation of application No. PCT/EP2018/066688, filed on Jun. 21, 2018.

(30) Foreign Application Priority Data

Dec. 21, 2017 (DE) .................... 10 2017 130 873.3

(51) Int. Cl.
*B30B 15/14* (2006.01)
*B21D 28/32* (2006.01)
(Continued)

(52) U.S. Cl.
CPC .......... *B30B 15/148* (2013.01); *B21D 28/325* (2013.01); *B21D 37/12* (2013.01);
(Continued)

(58) Field of Classification Search
None
See application file for complete search history.

(56) References Cited

U.S. PATENT DOCUMENTS 5,269,167 A 12/1993 Gerhart
2001/0048858 A1* 12/2001 Akamatsu .......... G05B 19/4065
409/134

(Continued)

FOREIGN PATENT DOCUMENTS

| DE | 10 2006 034 974 A1 | 1/2008 |
| EP | 1 764 168 A1 | 3/2007 |
| EP | 3 002 650 A1 | 4/2016 |

OTHER PUBLICATIONS

English translation of Mabuchi et al. Japanese Patent Document JP 2010017830, published Jan. 28, 2010.*

(Continued)

*Primary Examiner* — Bernard G Lindsay
(74) *Attorney, Agent, or Firm* — Harness, Dickey & Pierce, P.L.C.

(57) ABSTRACT

A method for monitoring and assessing correct position $P_i$ of a work slide of a wedge drive tool in a press, without a position sensor. The slide of the wedge drive tool is actuated from an end position $(X_E)$ back to the starting position $(X_A)$ of the slide by a spring. The spring is arranged in the wedge drive tool. The press is opened from a lower press position to an upper press position while a slide bed of the wedge drive tool is relieved. The position of the slide is indirectly detected in that at least the restoring force of the spring is detected and evaluated.

10 Claims, 2 Drawing Sheets

(51) Int. Cl.
*B21D 37/12* (2006.01)
*B30B 1/40* (2006.01)
*B30B 15/28* (2006.01)
*G05B 17/02* (2006.01)
*G05B 15/00* (2006.01)

(52) U.S. Cl.
CPC .............. *B30B 1/40* (2013.01); *B30B 15/28* (2013.01); *G05B 15/00* (2013.01); *G05B 17/02* (2013.01)

(56) References Cited

U.S. PATENT DOCUMENTS

| | | | |
|---|---|---|---|
| 2010/0119320 A1* | 5/2010 | Inoue | B23B 31/261 409/233 |
| 2011/0252905 A1* | 10/2011 | Lanksweirt | B21D 28/32 74/102 |
| 2017/0014888 A1 | 1/2017 | Meyer | |
| 2017/0252792 A1* | 9/2017 | Krönauer | B21D 37/10 |

OTHER PUBLICATIONS

CA International Search Report in corresponding PCT/EP2018/066688 dated Oct. 31, 2018.

\* cited by examiner

METHOD AND DEVICE FOR CONTROLLING A PRESS BASED ON WEDGE DRIVE TOOL SPRING CONDITION

CROSS-REFERENCE TO RELATED APPLICATIONS

This application is a continuation of International Application No. PCT/EP2018/066688, filed Jun. 21, 2018, which claims priority to German Application No. 10 2017 130 873.3, filed Dec. 21, 2017. The disclosures of the above applications are incorporating herein by reference.

FIELD

The disclosure relates to a method and a device for implementing the monitoring of a wedge drive tool.

BACKGROUND

Methods for making diagnostic statements or predictions regarding manufacturing machines or production systems are known from the prior art. System availability and functioning of a machine, such as a wedge drive tool, is an important factor for an efficient use of such machine.

There are two fundamentally different consequences if a system component or assembly in a system fails. Some components just cause the system to shut down. While this is undesirable, it allows the prevention of consequential damages. In a second group of devices, however, a functional failure can be associated with considerable consequential damages, for example in a wedge drive tool. If the restoring force of a gas pressure spring is too low and such a wedge drive tool mounted in a press is not actuated entirely back into its starting position, massive damage to the tool will result from the next stroke.

The main object of a method for monitoring the operable condition of a wedge drive tool, particularly one provided with gas pressure springs or hydraulic springs, is to enable an evaluation of the functioning of the gas pressure spring, preferably without service interruption.

Admittedly, preventive maintenance and empirical values can improve the availability of production systems and at the same time reduce down time and consequential damages as well as maintenance costs. But it remains a disadvantage that it is rarely possible to make exact predictions about the condition and time at which the spring, e.g. the gas pressure spring, can no longer provide sufficient restoring force to drive the wedge drive tool completely apart. Furthermore, it keeps happening in preventive maintenance that components such as a gas pressure spring are replaced as a precaution but still have a long remaining life. On the other hand, events can occur even with newly installed gas pressure springs where a relatively new gas pressure spring can no longer provide the required restoring force, e.g. due to excessive strain.

An alternative way of damage prevention is process monitoring. Condition-related process monitoring includes, for example, monitoring the pressure of the gas pressure spring.

U.S. Pat. No. 5,269,167A proposes moving a work slide back towards the starting position by the driver moving upwards under control of the press via so-called forced return mechanisms. Such an arrangement disadvantageously does not eliminate the need for preventive maintenance including frequent and tedious checks of the respective gas pressure spring or springs, respectively. Despite these measures, sudden failure of one or several return springs during the operation of the wedge drive tool cannot be detected immediately. This involves the risk of tool breakage or damage or destruction if the press-controlled driver continues to act on the work slide.

DE 10 2006 034 974 A1 proposes in this context to monitor period of time in pressing tools that use wedge drive tools that are brought into their working position by the movement of the press ram and typically returned to their starting position by spring force. To ensure that the slides are moved back into their starting positions, the disclosure proposes to provide a signaling device that outputs a signal when the restoring means (spring, etc.) has become ineffective. The solution proposed by DE 10 2006 034 974 A1 is to generate an optical and/or acoustic and/or a control signal, wherein the latter preferably is an electric/electronic and/or a hydraulic control signal for an advantageous immediate shutdown of a press equipped with the wedge drive tool. An immediate shutdown of the press, which may also be performed manually in response to an optical or acoustic signal, minimizes damage or destruction of the wedge drive tool and is reliably prevented in a preferably simple manner.

But the disadvantage remains that the period of time between detecting the signal and shutting down the press by hand or automatically may be too short. Thus, damage to the wedge drive tool and the press can still occur. Monitoring by a position sensor is therefore not suitable for all conditions. It would further be desirable to detect the frequency of movement of the wedge drive tool to obtain a prediction of its remaining service life.

Starting from prior art, it is therefore an object of the present disclosure to overcome the disadvantages mentioned above and to provide a simple and reliable device for monitoring a wedge drive tool that requires less of an effort.

SUMMARY

According to the disclosure, a method for monitoring the position and assessing the correct position $P_i$ of a slide, particularly a work slide of a wedge drive tool in a press, in particular without a position sensor, while actuating the slide bed of the wedge drive tool from an end position $(X_E)$ back to the starting position $(X_A)$ of the slide using a spring, preferably a gas pressure spring. The spring is arranged in the wedge drive tool. The position of the slide is indirectly detected in that at least the restoring force of the spring is detected and evaluated when opening the press from a lower press position to an upper press position.

The disclosure is based on the concept of not performing direct position monitoring of the wedge drive tool using position sensors but instead performing indirect position detection where the electronic evaluation unit uses the following mathematical relationship for evaluation:

$$Z(x, t) \sim F_m(x, t)$$

$$P_s(t) \sim F_s(x)$$

where $$Z(x, t) = \begin{cases} P_i \text{ impermissible}, & Fm(x) < Fs(x) \\ P_i \text{ permissible}, & Fm(x) \geq Fs(x) \end{cases}$$

wherein

Z (x,t): is the respective condition value at a point in time t, which represents a permissible or impermissible position of the slide of the wedge drive tool at position x between the potential positions $X_A$ and $X_E$ (starting position and end position), when the slide bed is relieved, $F_m$ (t) is the restoring force of the spring at the point in time t, $F_s$ (x) is the required target restoring force of the spring at the location x to actuate the wedge drive tool completely back into its starting position, $P_S$ (t) is the target position of the wedge drive tool at the point in time t, and Pi is the actual position of the wedge drive tool at the time the variable $F_m(t)$ is measured.

Monitoring may also be entirely time-invariant, i.e. continuous or discontinuous in time for specific target positions and/or points in time. The variable $F_m$ (x) is monitored and the current position $P_i$ of the wedge drive tool is inferred therefrom.

According to the disclosure, a method for monitoring the position and assessing the correct position $P_i$ of a slide is disclosed. It is particularly for a work slide of a wedge drive tool in a press, in particular without a position sensor. The slide bed of the wedge drive tool is actuated from an end position $X_E$ back to the starting position $X_A$ of the slide using a spring, preferably a gas pressure spring (10) that is arranged in the wedge drive tool 2. The press is opened from a lower press position to an upper press position while the driver of the wedge drive tool is relieved. The position of the slide is indirectly detected in that at least the restoring force of the spring 10 is detected and evaluated.

In a particularly preferred embodiment of the indirect position detection, the method comprises the following steps:

a) Detecting the restoring force $F_m$ (t) of the spring or gas pressure spring at at least one point in time t. This is either at or after the beginning of the press opening process where the slide, actuated by the gas pressure spring, is moved along the path x from its end position $X_E$ back into its starting position $X_A$;

b) Determining, by an electronic evaluation unit, such as a process on computer or the like, whether the restoring force $F_m$ (t) is equal to, greater or smaller than a specified target restoring force $F_s$ (x), to which the restoring force at the location x of the slide should correspond, and c) Determining the respective condition value at the point in time t, which represents a permissible or impermissible actual position $P_i$ of the slide of the wedge drive tool at position x between the potential positions $X_A$ and $X_E$ (starting position and end position), and $$Z(x, t) = \begin{cases} P_i \text{ impermissible}, & Fm(x) < Fs(x) \\ P_i \text{ permissible}, & Fm(x) \geq Fs(x) \end{cases}$$

d) Generating an action for stopping the press if the condition value $P_i$ is found to be impermissible.

Preferably, the spring includes a wireless data transmission unit to transmit the measured restoring force $F_m(t)$ to the electronic evaluation unit. This unit may be integrated in the restoring spring or arranged on the housing of the spring.

Furthermore, in another preferred embodiment, a piezo element counts the strokes of the spring. A statement about the remaining service life and/or number of remaining strokes is made. It is based on the strike rate N and the time differential of the restoring force $F_m(t)$ of the spring measured at each stroke. Thus, it is not absolutely required that the restoring force is measured at each stroke to determine a differential between subsequent strokes. This differential may also be determined after a defined number of strokes, depending on consistency. For example, if the restoring force in the range decreases by less than 0.1% the respective differential can be obtained using measured values after a respectively large number of strokes, e.g., every 100 or 1000 strokes. Thus, consistency or decrease of the restoring force can be inferred from the time differential, from which the remaining service life can be inferred.

In another advantageous embodiment, a piezo element can be used to detect a specific vibration pattern per stroke of the spring. A statement about the remaining service life and/or the number of remaining strokes can be made based on the change in the vibration pattern. The remaining service life or operating hours of the gas pressure springs which were used under comparable general conditions, can be inferred from reference values of such vibration patterns.

Another aspect relates to a device for position monitoring, particularly without position sensors. An assessment is made of the correct position $P_i$ of a wedge drive tool in a press when actuating the wedge drive tool from an end position back $X_E$ into its starting position $X_A$ using a spring. Preferably, a gas pressure spring is disposed in the wedge drive tool when opening the press from a lower press position into an upper press position. Measuring and evaluation units are provided that at least detect the restoring force $F_m(t)$ of the spring at a point in time t when opening the press. The evaluation unit is configured to evaluate the measured data according to the above described method.

It is further advantageous to provide a shutoff to shut down the press directly depending on the value of the detected restoring force $F_m(t)$ of the spring.

In another advantageous embodiment, a wireless data transmission unit is provided to transmit measured data. Particularly, the data is of the restoring force $F_m(t)$ of the spring and is transmitted to an evaluating unit. Another option of ensuring proper operation can be to provide a RFID chip or other detection devices at the gas pressure spring. They include data to identify if the component is a component of the manufacturer of the device or a substitute or replacement product of another manufacturer.

This is relevant inasmuch as replacement products may not be fully compatible with data capture and evaluation. Thus, a signal may be outputted to the user that the replaced gas pressure spring is not properly compatible with other components and measured value errors due to incorrect calibration, cannot be ruled out.

It is also advantageous if a measuring sensor system for measuring the restoring force of the spring and/or a data transmission unit is/are arranged in a data locker detachably connected to the spring with a housing enclosing the data locker.

It is further advantageous to provide a piezo sensor for measuring the number of strokes and/or the vibration characteristics of the spring or of the wedge drive tool connected to the spring.

Another aspect relates to a wedge drive tool for operating a press. The wedge drive tool has a press-controlled slide bed for driving a slide of the wedge drive tool. It can be moved in the working direction via inclined sliding surfaces. The slide can be brought into its starting position $X_A$ relative to a rigidly disposed driver by a spring when relieved from the slide bed. A device as described above is provided to monitor the position and to evaluate the correct position $P_i$ of the slide of the wedge drive tool, particularly when relived from the slide bed.

Other advantageous further developments of the disclosure are characterized in the dependent claims or are explained in more detail below with reference to the figures and together with a preferred embodiment of the disclosure.

DRAWINGS

The drawings described herein are for illustrative purposes only of selected embodiments and not all possible implementations, and are not intended to limit the scope of the present disclosure.

DETAILED DESCRIPTION

The disclosure is described in detail below with reference to FIGS. 1 to 3. The same reference symbols indicate same structural and/or functional features.

Figure 1:
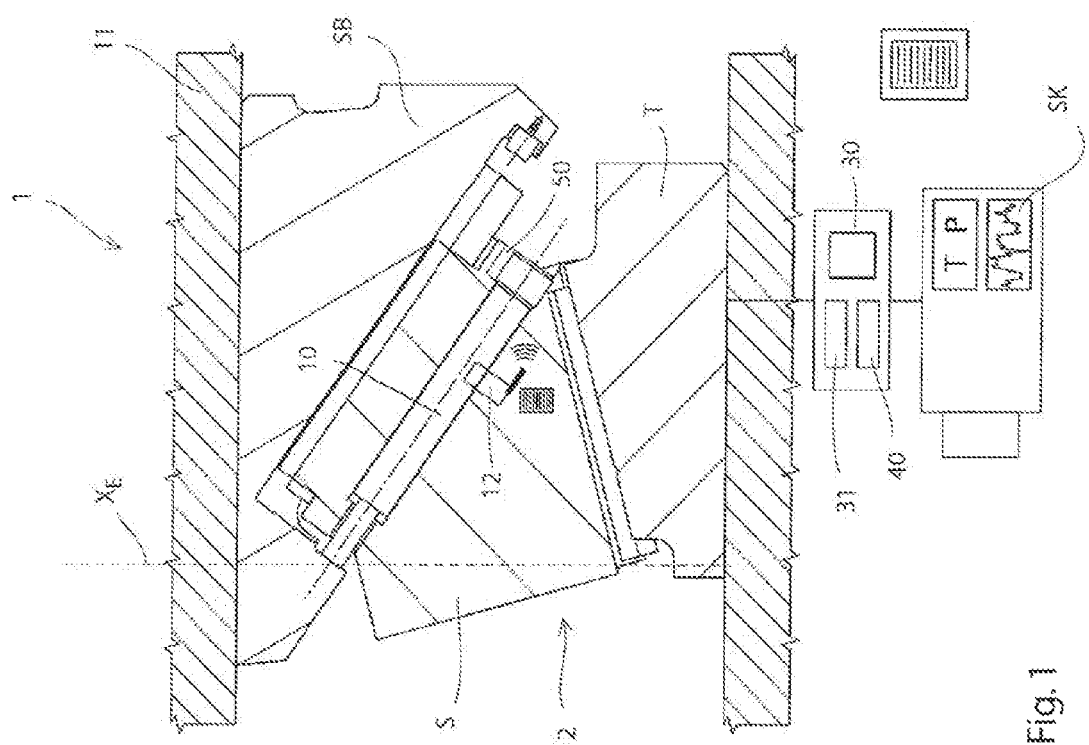
FIG. 1 is a schematic representation of a press with a wedge drive tool in the closed state of the press with the upper and lower press parts moved together.

FIG. 1 is a schematic representation of a press 11 with a wedge drive tool 2 and the device 1.

Figure 2:
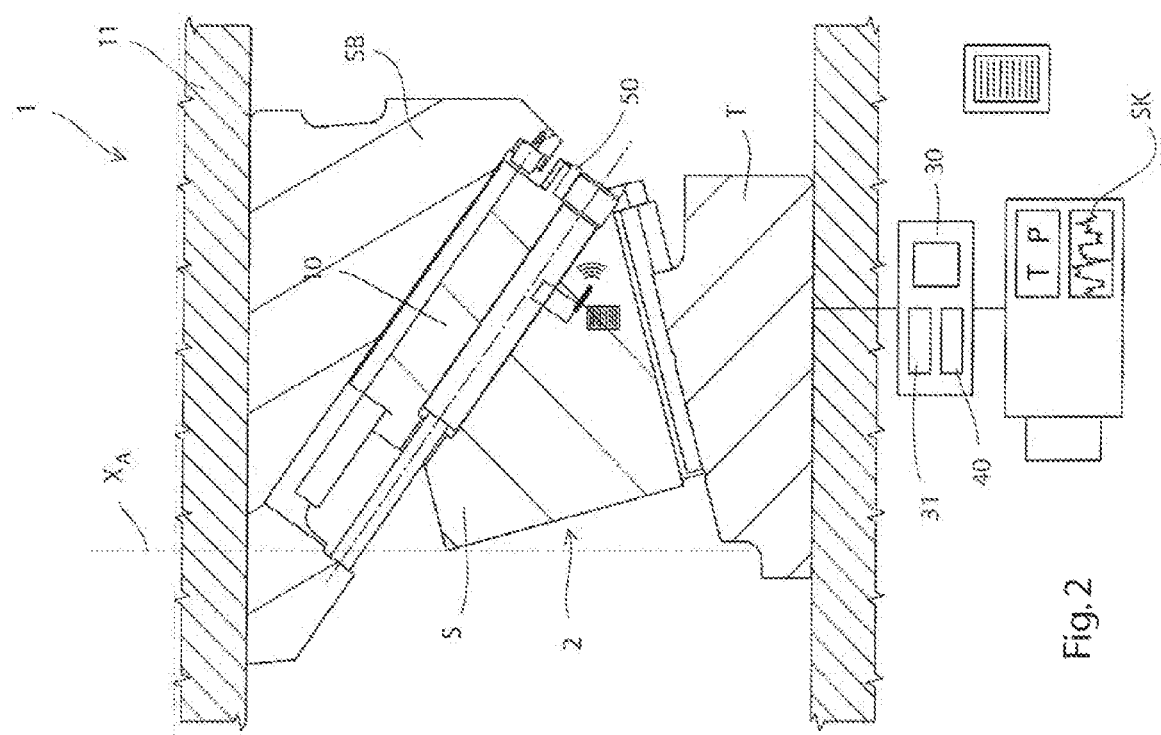
FIG. 2 is a schematic representation of a press with a wedge drive tool in the open state of the press with the upper and lower press parts moved apart.

The device 1 is configured for position monitoring, particularly without position sensors, and assessment of the correct position $P_i$ of a wedge drive tool 2 between a position $X_E$ (see FIG. 1) and a position $X_A$ (see FIG. 2). The tool is disposed in a press 11.

The wedge drive tool 2 is installed in a press 11. The wedge drive tool 2 has a press-controlled slide bed SB for driving a slide S of the wedge drive tool 2. The slide 9 can be moved in the working direction via inclined sliding surfaces. It can be brought into its starting position $X_A$ relative to a rigidly disposed driver T by means of a spring 10 when relived from the slide bed SB.

The device 1 is configured to assess the correct functioning of the restoring spring 10 when the wedge drive tool 2 is actuated from an end position $X_E$ back into its starting position $X_A$ via the gas pressure spring 10 when opening the press 11. Measuring unit and evaluating unit are provided. Various processor known in the art may be used. At least the restoring force $F_m(t)$ of the spring 10 is detected at a point in time t when opening the press 11. The evaluating unit 31 is configured to evaluate the respective measured data.

A shutoff 40 is shown purely schematically. The shutoff 40 is connected to the evaluating unit 30 to directly shut down the press 11 depending upon the value of the detected restoring force $F_m(t)$ of the spring 10.

As is further visible in FIG. 1, the data transmission device 12 is configured as a wireless data transmission device to transmit measured data. Particularly, the restoring force $F_m(t)$ of the gas pressure spring 10 is transmitted in this manner to the evaluating unit 30.

Figure 3:
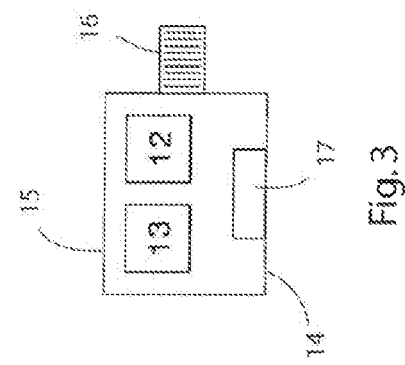
FIG. 3 is a data locker configured to detachably connect to a gas pressure spring.

The data locker 14 shown in FIG. 3 has an integrated energy storage unit 17, a measuring sensor system 13 for measuring the restoring force of the spring 10, and the data transmission unit 12. The data locker 14 is provided with a housing 15 enclosing the data locker 14. A screw engagement 16 detachably connects to the spring 10. In this way, the data locker 14 can have a mobile and autonomous design and be customized depending on the type of gas pressure spring. In an optional embodiment, the data locker 14 may include target value memory units to capture target values for sensors, battery voltage, voltage monitoring of the energy storage unit 17, and the like.

Furthermore, FIG. 1 shows a merely exemplary piezo sensor 50 to measure the number of strokes and/or vibration characteristics SK of the spring 10.

The implementation of the disclosure is not limited to the preferred embodiments described above. Instead, a number of variants is conceivable where the solution described is used even for completely different designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for monitoring and assessing a position $P_i$ of a work slide of a wedge drive tool in a press, without a position sensor, comprising the steps of:
   actuating a slide bed of the wedge drive tool from an end position ($X_E$) back to a starting position ($X_A$) of the work slide;
   using a gas pressure spring, arranged in the wedge drive tool, to actuate the slide bed;
   opening the press from a lower press position to an upper press position;
   indirectly detecting the position of the slide; and
   detecting and evaluating at least the restoring force of the spring, further comprising the following steps:
   a) Detecting the restoring force $F_m(t)$ of the gas pressure spring at at least one point in time t, that is either at or after the beginning of the respective opening process of the press where the slide, actuated by the gas pressure spring, moves along a path x from its end position ($X_E$) back to its starting position ($X_A$);
   b) Determining, by an electronic evaluation unit, whether the restoring force $F_m(t)$ is equal to, greater or smaller than a specified target restoring force Fs (x), that the restoring force at the location x of the slide corresponds to; and
   c) Determining the respective condition value Z (x, t) at the point in time t, which represents a permissible or impermissible position $P_i$ of the wedge drive tool at position x between the starting position $X_A$ and end position $X_E$, where $$Z(x, t) = \begin{cases} P_i \text{ impermissible}, & Fm(x) < Fs(x) \\ P_i \text{ permissible}, & Fm(x) \geq Fs(x) \end{cases}$$

d) Generating an action that stops the press if the condition value is found to be impermissible.

2. The method according to claim 1, wherein the spring comprises a wireless data transmission device to transmit the measured restoring force $F_m(t)$ to the electronic evaluation unit.

3. The method according to claim 1, further comprising a piezo element counting the strokes of the spring, and a statement about remaining service life and/or number of remaining strokes is made based on a strike rate N and the time differential of the restoring force $F_m(t)$ of the spring as measured per each stroke.

4. The method according to claim 1, further comprising using a piezo element to detect a specific vibration pattern per stroke of the spring, and a statement about remaining service life and/or a number of remaining strokes is made, or a measure of wear is detected, based on a change in the vibration pattern.

5. A device for position monitoring, without position sensors, and assessment of the position $P_i$ of the wedge drive tool in the press when actuating the wedge drive tool from the end position ($X_E$) back into its starting position ($X_A$) using the gas pressure spring disposed in the wedge drive tool when opening the press from a lower press position into an upper press position, comprising a measuring unit, and evaluation unit; the measuring unit at least detecting the restoring force $F_m(t)$ of the spring at a point in time t when opening the press; and the evaluation unit configured to evaluate the measured data according to the method of claim 1.

6. The device according to claim 5, wherein a shutoff directly shuts down the press depending upon the value of the detected restoring force $F_m(t)$ of the spring.

7. The device according to claim 5, further including a wireless data transmission unit to transmit measured data, comprising the restoring force $F_m(t)$ of the spring to the evaluating unit.

8. The device according to claim 5, wherein a measuring sensor system, for measuring the restoring force of the spring, and/or a data transmission unit is/are arranged in a data locker detachably connected to the spring with a housing enclosing the data locker.

9. The device according to claim 5, further including a piezo sensor for measuring a number of strokes and/or vibration characteristics of the spring or of the wedge drive tool connected to the spring.

10. A wedge drive tool for operating a press, the wedge drive tool comprising a press-controlled slide bed for driving a slide of the wedge drive tool, the slide being movable in the working direction via inclined sliding surfaces, the slide being brought into its starting position ($X_A$) relative to a rigidly disposed driver by a spring, a device according to claim 5 to monitor and to evaluate the position $P_i$ of the slide of the wedge drive tool, when relieved from the slide bed.

* * * * *